United States Patent
Tomida (10) Patent No.: US 11,999,198 B2
(45) Date of Patent: Jun. 4, 2024

(54) PNEUMATIC TIRE

(71) Applicant: BRIDGESTONE CORPORATION, Tokyo (JP)

(72) Inventor: Tatsuya Tomida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 248 days.

(21) Appl. No.: 17/614,748

(22) PCT Filed: May 27, 2020

(86) PCT No.: PCT/JP2020/020999
§ 371 (c)(1),
(2) Date: Nov. 29, 2021

(87) PCT Pub. No.: WO2020/250687
PCT Pub. Date: Dec. 17, 2020

(65) Prior Publication Data
US 2022/0227180 A1    Jul. 21, 2022

(30) Foreign Application Priority Data
Jun. 14, 2019 (JP) .................................. 2019-110816

(51) Int. Cl.
| | | |
|---|---|---|
| B60C 11/03 | (2006.01) | |
| B60C 11/00 | (2006.01) | |
| B60C 11/12 | (2006.01) | |

(52) U.S. Cl.
CPC ...... B60C 11/1281 (2013.01); B60C 11/0008 (2013.01); B60C 11/005 (2013.01);
(Continued)

(58) Field of Classification Search
CPC ............ B60C 11/0323; B60C 11/1281; B60C 11/005; B60C 2011/0025
See application file for complete search history.

(56) References Cited

U.S. PATENT DOCUMENTS

| | | |
|---|---|---|
| 2013/0213542 A1 | 8/2013 | Warfford et al. |
| 2015/0059943 A1 | 3/2015 | Radulescu et al. |
| | (Continued) | |

FOREIGN PATENT DOCUMENTS

| | | |
|---|---|---|
| JP | S61-132105 U | 8/1986 |
| JP | 01-101205 A  * | 4/1989 |
| | (Continued) | |

OTHER PUBLICATIONS

Translation for Japan 2001-130227 (Year: 2023).*
(Continued)

*Primary Examiner* — Steven D Maki
(74) *Attorney, Agent, or Firm* — Oliff PLC (57) ABSTRACT

A pneumatic tire includes, on a tread surface, a plurality of circumferential main grooves extending in the tread circumferential direction, and a plurality of land portions each defined between circumferential main grooves adjacent in the tread width direction among the plurality of circumferential main grooves, or by a circumferential main groove and a tread edge. A widthwise groove (widthwise sipe) (circumferential sipe) includes a widened portion, on the groove bottom side (sipe bottom side), at which the groove width (sipe width) is larger than on the tread surface side. The storage modulus of tread rubber located in a tire radial direction region including at least a reference depth position is larger than a storage modulus of tread rubber located in regions inward and outward in the tire radial direction from the tire radial direction region.

12 Claims, 3 Drawing Sheets

(52) U.S. Cl.
CPC ...... *B60C 11/0323* (2013.01); *B60C 11/1259* (2013.01); *B60C 2011/0025* (2013.01); *B60C 2011/0381* (2013.01)

(56) References Cited

U.S. PATENT DOCUMENTS

| | | | |
|---|---|---|---|
| 2017/0050469 A1* | 2/2017 | Hashimoto | ........... B60C 11/005 |
| 2017/0355231 A1 | 12/2017 | Marlier et al. | |
| 2021/0155046 A1* | 5/2021 | Blouin | ................ B60C 11/1281 |

FOREIGN PATENT DOCUMENTS

| | | | |
|---|---|---|---|
| JP | 2001-130227 A | * | 5/2001 |
| JP | 2002-114010 A | | 4/2002 |
| JP | 2013-133084 A | | 7/2013 |
| JP | 2013-540077 A | | 10/2013 |
| JP | 2015-512352 A | | 4/2015 |
| JP | 2018-504307 A | | 2/2018 |
| WO | 2018/118023 A1 | | 6/2018 |
| WO | 2019/020368 A1 | | 1/2019 |
| WO | 2019/102148 A1 | | 5/2019 |

OTHER PUBLICATIONS

Machine translation for Japan 01-101205 (Year: 2023).*
May 31, 2023 Extended European Search Report Issued in European Patent Application No. 20822192.9.
Aug. 4, 2020 International Search Report issued in International Patent Application No. PCT/JP2020/020999.
Dec. 14, 2021 International Preliminary Report on Patentability issued in International Patent Application No. PCT/JP2020/020999.

* cited by examiner

PNEUMATIC TIRE

TECHNICAL FIELD

The present disclosure relates to a pneumatic tire.

BACKGROUND

As technology for improving the drainage performance of a tire when wear progresses, it has been proposed to provide grooves, in the tread surface of a tire, whose groove width increases when wear progresses. For example, see Patent Literature (PTL) 1.

CITATION LIST

Patent Literature

PTL 1: JP 2013-540077 A

SUMMARY

Technical Problem

With the technology disclosed in PTL 1, however, as a portion with increased groove width is about to appear when wear progresses, the rigidity of the portion decreases, and local wear occurs. This may lead to uneven wear in the tire.

The present disclosure aims to provide a pneumatic tire capable of improving the drainage performance while suppressing the occurrence of uneven wear when wear progresses.

Solution to Problem

A summary of the present disclosure is as follows.

(1) A pneumatic tire including, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein the land portion includes a plurality of widthwise grooves extending in the tread width direction, the widthwise groove includes a widened portion, on a groove bottom side, at which a groove width is larger than on the tread surface side, when the pneumatic tire is mounted on an applicable rim, filled to a prescribed internal pressure, and under no load, a groove depth position, farthest outward in a tire radial direction, at which the groove width of the widened portion of the widthwise groove is 2.5 or more times an opening width of the widthwise groove at the tread surface is designated as a reference depth position, and a storage modulus of tread rubber located in a tire radial direction region including at least the reference depth position is larger than a storage modulus of tread rubber located in regions inward and outward in the tire radial direction from the tire radial direction region.

(2) A pneumatic tire including, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein the land portion includes a plurality of widthwise sipes extending in the tread width direction, the widthwise sipe includes a widened portion, on a sipe bottom side, at which a sipe width is larger than on the tread surface side, when the pneumatic tire is mounted on an applicable rim, filled to a prescribed internal pressure, and under no load, a sipe depth position, farthest outward in a tire radial direction, at which the sipe width of the widened portion of the widthwise sipe is 2.5 or more times an opening width of the widthwise sipe at the tread surface is designated as a reference depth position, and a storage modulus of tread rubber located in a tire radial direction region including at least the reference depth position is larger than a storage modulus of tread rubber located in regions inward and outward in the tire radial direction from the tire radial direction region.

(3) A pneumatic tire comprising, on a tread surface, a plurality of circumferential main grooves extending in a tread circumferential direction, and a plurality of land portions, each land portion being defined between circumferential main grooves adjacent in a tread width direction among the plurality of circumferential main grooves, or by the circumferential main groove and a tread edge, wherein the land portion includes at least one circumferential sipe extending in the tread circumferential direction, the circumferential sipe includes a widened portion, on a sipe bottom side, at which a sipe width is larger than on the tread surface side, when the pneumatic tire is mounted on an applicable rim, filled to a prescribed internal pressure, and under no load, a sipe depth position, farthest outward in a tire radial direction, at which the sipe width of the widened portion of the circumferential sipe is 2.5 or more times an opening width of the circumferential sipe at the tread surface is designated as a reference depth position, and a storage modulus of tread rubber located in a tire radial direction region including at least the reference depth position is larger than a storage modulus of tread rubber located in regions inward and outward in the tire radial direction from the tire radial direction region.

Here, the "tread surface" refers to the entire tread surface in the tread circumferential direction that comes into contact with the road surface when the pneumatic tire is mounted on an applicable rim, filled to a prescribed internal pressure, and subjected to the maximum load.

The "circumferential main groove" refers to a groove extending in the tread circumferential direction and having an opening width of 1.5 mm or more at the aforementioned tread surface when the pneumatic tire is mounted on an applicable rim, filled to a prescribed internal pressure, and under no load.

The "tread edges" refer to the outermost points of the aforementioned tread surface on both sides in the tire width direction.

The "widthwise groove" refers to a groove extending in the tread width direction and having an opening width of 1.0 mm or more at the aforementioned tread surface when the pneumatic tire is mounted on an applicable rim, filled to a prescribed internal pressure, and under no load.

The "widthwise sipe" refers to a sipe extending in the tread width direction and having an opening width of less than 1.0 mm at the aforementioned tread surface when the pneumatic tire is mounted on an applicable rim, filled to a prescribed internal pressure, and under no load.

The "circumferential sipe" refers to a sipe extending in the tread circumferential direction and having an opening width of less than 1.5 mm at the aforementioned tread surface when the pneumatic tire is mounted on an applicable rim, filled to a prescribed internal pressure, and under no load.

The "storage modulus" refers to the storage modulus measured at a temperature of 25° C. in accordance with JIS K7244.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "prescribed internal pressure" refers to the air pressure (maximum air pressure) corresponding to the maximum load capability prescribed for each vehicle on which the tire is mounted.

The "maximum load" refers to the load corresponding to the aforementioned maximum load capability.

Advantageous Effect

According to the present disclosure, a pneumatic tire capable of improving the drainage performance while suppressing the occurrence of uneven wear when wear progresses can be provided.

DETAILED DESCRIPTION

Embodiments of the present disclosure are described below in detail with reference to the drawings.

The internal structure and the like of the pneumatic tire (hereinafter referred to simply as the tire) can be the same as those of conventional tires. As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to a prescribed internal pressure, and under no load.

Figure 1:
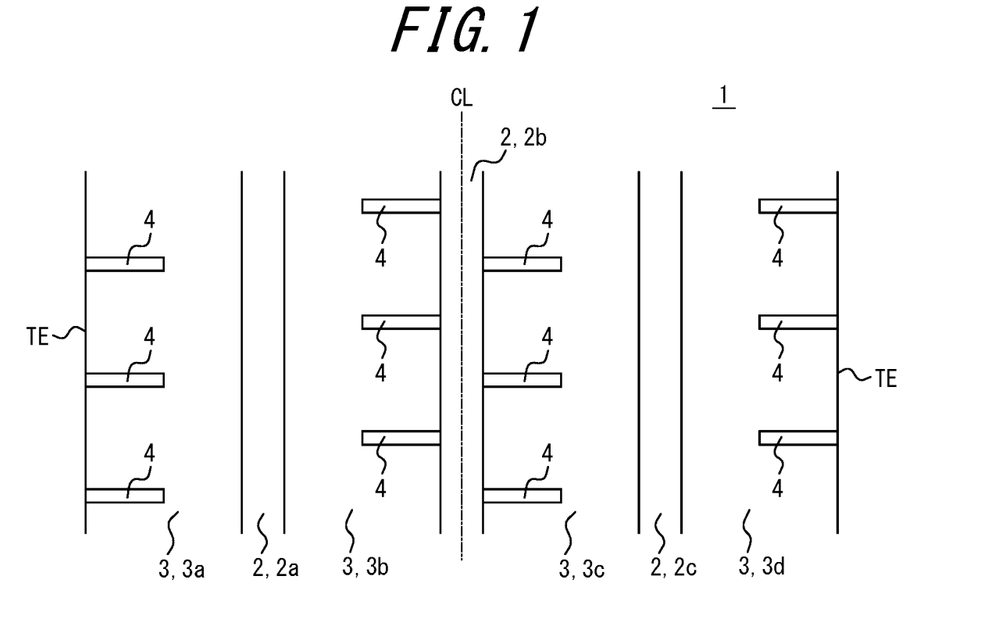
FIG. 1 is a developed view schematically illustrating a tread pattern of a pneumatic tire according to an embodiment of the present disclosure.

FIG. 1 is a developed view schematically illustrating a tread pattern of a pneumatic tire according to an embodiment of the present disclosure.

As illustrated in FIG. 1, the tire in the present example includes, on a tread surface 1, a plurality (three in the illustrated example) of circumferential main grooves 2 (2a, 2b, 2c) extending in the tread circumferential direction, and a plurality (four in the illustrated example) of land portions 3 (3a, 3b, 3c, 3d) defined by circumferential main grooves 2 adjacent in the tread width direction among the plurality of circumferential main grooves 2, or by a circumferential main groove (2a, 2c) and a tread edge TE. In the present example, one circumferential main groove 2b is positioned on the tire equatorial plane CL, and the other circumferential main grooves 2a, 2c are respectively positioned in one half and the other half, in the tread width direction, divided by the tire equatorial plane CL. In the present example, two land portions 3 are arranged in each tread widthwise half. As illustrated, the land portions 3b, 3c are land portions by the center in the tread width direction, and the land portions 3a, 3d are land portions adjacent to the tread edges TE.

In the example illustrated in FIG. 1, the number of circumferential main grooves 2 is three, but the number can be two or can be four or more. Accordingly, the number of land portions 3 can also be three, or can be five or more. In the present example, all of the land portions are rib-like land portions 3, but at least one of the land portions may be a land portion that is not rib-like, i.e., a block-shaped land portion. A "rib-like land portion" refers to a land portion that is not completely divided in the tread circumferential direction by a widthwise groove extending in the tread width direction. Accordingly, in the present specification, a land portion is a "rib-like land portion" even if it is completely divided in the tread circumferential direction by a widthwise sipe.

The groove width (opening width (opening width measured perpendicular to the extending direction of the groove in plan view)) of the circumferential main groove 2 is not particularly limited, since the groove width depends on the number of circumferential main grooves 2, but can, for example, be between 5 mm and 25 mm. Similarly, the groove depth (maximum depth) of the circumferential main groove 2 is not particularly limited, but can, for example, be between 6 mm and 18 mm.

In the illustrated example, the circumferential main grooves 2 all extend along the tread circumferential direction (without inclination) in plan view of the tread surface 1, but at least one of the circumferential main grooves 2 may extend at an inclination relative to the tread circumferential direction. In this case, the circumferential main groove 2 may be inclined at an angle of, for example, 5° or less relative to the tread circumferential direction. In the illustrated example, all of the circumferential main grooves 2 extend straight in the tread circumferential direction, but at least one of the circumferential main grooves 2 may have a shape such as a zigzag shape or a curved shape.

In the illustrated example, each land portion 3 includes a plurality of widthwise grooves 4 extending in the tread width direction. Specifically, in the present example, the (rib-like in the illustrated example) land portions 3a, 3d adjacent to the tread edges TE include widthwise grooves 4, three each in the illustrated range, that extend from the tread edge TE inward in the tread width direction and terminate in the (rib-like in the illustrated example) land portions 3a, 3d. The (rib-like in the illustrated example) land portions 3b, 3c by the center in the tread width direction include widthwise grooves 4, three each in the illustrated range, that extend outward in the tread width direction from the circumferential main groove 2b positioned on the tire equatorial plane CL and terminate in the (rib-like in the illustrated example) land portions 3b, 3c. The number of the widthwise grooves 4 can be appropriately set. In the illustrated example, all of the land portions 3 include the widthwise grooves 4. When the widthwise grooves 4 are included on the tread surface 1, however, it suffices for any land portion 3 to include the widthwise grooves 4, and the land portions 3 defined by the tread edges TE (land portions 3a, 3d in the illustrated example) preferably include the widthwise grooves 4.

Here, the groove width (opening width (opening width measured perpendicular to the extending direction of the groove in plan view)) of the widthwise groove 4 is not particularly limited, since the groove width depends on the number of widthwise grooves 4, but can, for example, be between 1.0 mm and 1.5 mm. Similarly, the groove depth (maximum depth) of the widthwise groove 4 is not particularly limited, but can, for example, be between 4 mm and 18 mm.

In the illustrated example, all of the widthwise grooves 4 extend along the tread width direction (without inclination), but at least one of the widthwise grooves 4 may extend at an inclination relative to the tread width direction. In this case, the widthwise grooves 4 are preferably inclined relative to the tread width direction at an inclination angle of 45° or less, and are preferably inclined at an inclination angle of 30° or less. In the illustrated example, all of the widthwise grooves 4 extend straight in the tread width direction, but at least one of the widthwise grooves 4 may have a bent portion.

Here, to improve the drainage performance, the widthwise grooves 4 preferably open at the tread edge TE or a circumferential main groove 2, for example, as in the illustrated example. On the other hand, to increase the rigidity of the land portion 3, the widthwise grooves 4 can be configured not to open to either the tread edge TE or the circumferential main groove 2, so that both ends terminate in the land portion 3. Also, in the land portion 3 defined between two circumferential main grooves 2 adjacent in the tread width direction, the widthwise groove 4 may open to either of the two circumferential main grooves 2.

In the illustrated example, each land portion 3 includes a plurality of widthwise grooves 4 and no sipes. At least one of the land portions 3, however, can be configured to include sipes instead of or in addition to the widthwise grooves 4. An embodiment in which the land portion 3 includes sipes will be described below.

Figure 2:
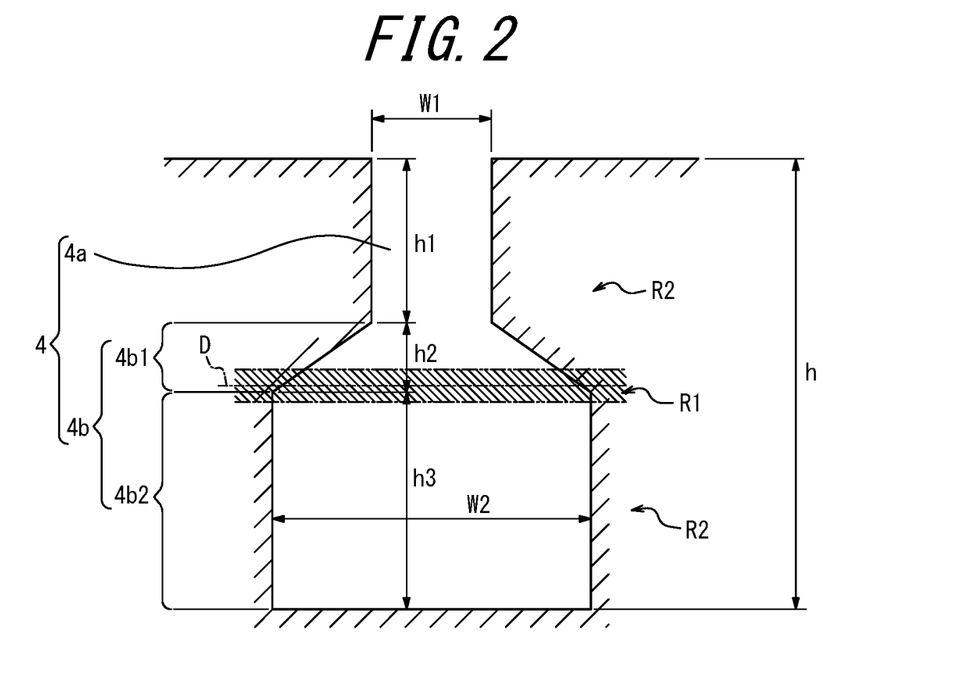
FIG. 2 is a cross-sectional view schematically illustrating an example of a widthwise groove.

FIG. 2 is a cross-sectional view schematically illustrating an example of a widthwise groove. FIG. 2 is a tread circumferential cross-sectional view of a widthwise groove extending along the tread width direction. FIG. 2 illustrates a state in which the tire is mounted on an applicable rim, filled to a prescribed internal pressure, and under no load. In the example illustrated in FIG. 2, the widthwise groove 4 includes a constant groove width portion 4a on the tread surface 1 side, in which the groove width (width measured parallel to the tread surface in a cross-sectional view) is constant (equivalent to the opening width at the tread surface 1), and a widened portion 4b on the groove bottom side, in which the groove width is larger than on the tread surface 1 side. In the illustrated example, the widened portion 4b is formed by a first widened portion 4b1 in which the groove width gradually increases towards the groove bottom and a second widened portion 4b2 in which the groove width is constant (and larger than the opening width at the tread surface 1).

In the illustrated example, the widened portion 4b is formed by the first widened portion 4b1 and the second widened portion 4b2, but the widened portion 4b can be configured to include only a portion (for example, the first widened portion 4b1) in which the groove width changes in the groove depth direction, or configured to include only a portion (the second widened portion 4b2) in which the groove width is constant (and larger than the opening width at the tread surface 1). Alternatively, a portion (for example, the first widened portion 4b1) in which the groove width changes and/or a portion (the second widened portion 4b2) in which the groove width is constant (and larger than the opening width at the tread surface 1) may be provided at a plurality of locations in the groove depth direction.

In the present example, the portion farther outward in the tire radial direction than the widened portion 4b is the constant groove width portion 4a that has a constant groove width, but this portion can also be a portion with a variable groove width.

In the present example, the groove width of the first widened portion 4b1 gradually increases linearly from the outside towards the inside in the tire radial direction (the rate of increase in groove width is constant), but the rate of increase in groove width may be variable.

The groove width W1 of the constant groove width portion 4a is not particularly limited but can, for example, be between 1.0 mm and 1.5 mm. The maximum width W2 of the widened portion 4b is not particularly limited but can, for example, be between 1.2 mm and 6.0 mm. The groove depth h of the widthwise groove 4 is not particularly limited but can, for example, be between 4.0 mm and 18.0 mm. The groove width at the bottom of the widthwise groove 4 is preferably larger than 2.5 W1.

The extension length h1 in the depth direction of the constant groove width portion 4a is not particularly limited but can, for example, be between 2.0 mm and 12 mm. The extension length h2+h3 in the depth direction of the widened portion 4b is not particularly limited but can, for example, be between 2.5 mm and 11.0 mm. In the example illustrated in FIG. 2, the extension length h2 of the first widened portion 4b1 in the depth direction is not particularly limited but can, for example, be between 1.0 mm and 3.0 mm, and the extension length h3 of the second widened portion 4b2 in the depth direction is not particularly limited but can, for example, be between 1.5 mm and 8.0 mm.

As illustrated in FIG. 2, when the tire is mounted on an applicable rim, filled to a prescribed internal pressure, and under no load, and the opening width of the widthwise groove 4 at the tread surface 1 (i.e., the width of the constant groove width portion 4a in the present example) is W1, the groove depth position, farthest outward in the tire radial direction, at which the groove width of the widened portion 4b is at least 2.5 W1 is designated as a reference depth position D. In the case in which the first widened portion 4b1 and the second widened portion 4b2 are included, as in the illustrated example, then the reference depth position D is included in the first widened portion 4b1 in the present example, but the reference depth position D may be included in the second widened portion 4b2.

At the aforementioned reference depth position D, the rigidity usually starts to decrease when wear progresses.

In the tire of the present embodiment, the storage modulus of the tread rubber located in a tire radial direction region R1 including at least the reference depth position D is larger than the storage modulus of the tread rubber located in regions R2 inward and outward in the tire radial direction from the tire radial direction region (specifically, in the present embodiment, the storage modulus of the tread rubber in the tire radial direction region R1 is 1.5 or more times the storage modulus of the tread rubber in the regions R2 inward and outward in the tire radial direction from the tire radial direction region).

In the present embodiment, the tire radial direction region R1 includes a region extending 0.5 mm inward and 0.5 mm outward in the tire radial direction from the reference depth position D (in particular, a region extending 1.0 mm inward and 1.0 mm outward in the tire radial direction from the reference depth position D in the present example).

The extension form of the tread rubber with the above-described relatively high storage modulus can be as follows in a land portion to which the tread rubber with the above-described relatively high storage modulus is applied.

In the present example, the tread rubber with the above-described relatively high storage modulus extends continuously in the tread circumferential direction. The tread rubber with the above-described relatively high storage modulus can, however, be configured to extend in the tread width direction, or to exist only in a region surrounding the maximum width of the widened portion 4b in a transparent plan view from the tread surface 1 side (for example, a region surrounding 1 mm to 10 mm more than the maximum width).

In the present example, the thickness of the tread rubber in the tire radial direction region R1, with the above-described relatively high storage modulus, is constant. However, the thickness of the tread rubber in the tire radial direction region R1, with the above-described relatively high storage modulus, may change or include a discontinuous portion.

For example, in the case in which the tread rubber in the tire radial direction region R1, with the above-described relatively high storage modulus, extends continuously in the tread circumferential direction, and the thickness of the tread rubber in the tire radial direction region R1, with the above-described relatively high storage modulus, changes in the tread circumferential direction, then the thickness of the tread rubber at and near the widthwise groove 4 is preferably larger than the thickness of the tread rubber at and near the center, in the tread circumferential direction, between two widthwise grooves 4 adjacent in the tread circumferential direction. In the case in which the tread rubber in the tire radial direction region R1, with the above-described relatively high storage modulus, extends in the tread circumferential direction and includes a discontinuous portion in the tread circumferential direction, for example, the discontinuous portion is preferably located at and near the center, in the tread circumferential direction, between two widthwise grooves 4 adjacent in the tread circumferential direction.

The effects of the pneumatic tire according to the present embodiment are described below.

The pneumatic tire of the present embodiment includes a plurality of widthwise grooves 4 extending in the tread width direction in the land portion 3, and the widthwise grooves 4 include the widened portion 4b, on the groove bottom side, at which the groove width is larger than on the tread surface 1 side. As a result, the widened portion 4b with a larger groove width is exposed to the tread surface when wear progresses, thereby improving the drainage performance when wear progresses.

In the tire of the present embodiment, the storage modulus of the tread rubber located in the tire radial direction region R1 including at least the reference depth position D is larger than the storage modulus of the tread rubber located in the regions R2 inward and outward in the tire radial direction from the tire radial direction region. This can improve the rigidity at and near the reference depth position D when wear progress, thereby suppressing local wear and uneven wear of the tire.

As described above, according to the pneumatic tire of the present embodiment, the drainage performance can be improved while the occurrence of uneven wear is suppressed when wear progresses.

Furthermore, in the present embodiment, the tire radial direction region R1 includes a region extending 0.5 mm inward and 0.5 mm outward in the tire radial direction from the reference depth position D. The drainage performance can therefore be improved while the occurrence of uneven wear is further suppressed when wear progresses.

In the present embodiment, the storage modulus of the tread rubber located in the tire radial direction region R1 is 1.5 or more times the storage modulus of the tread rubber in the regions R2 inward and outward in the tire radial direction from the tire radial direction region. The drainage performance can therefore be improved while the occurrence of uneven wear is even further suppressed when wear progresses.

Figure 3:
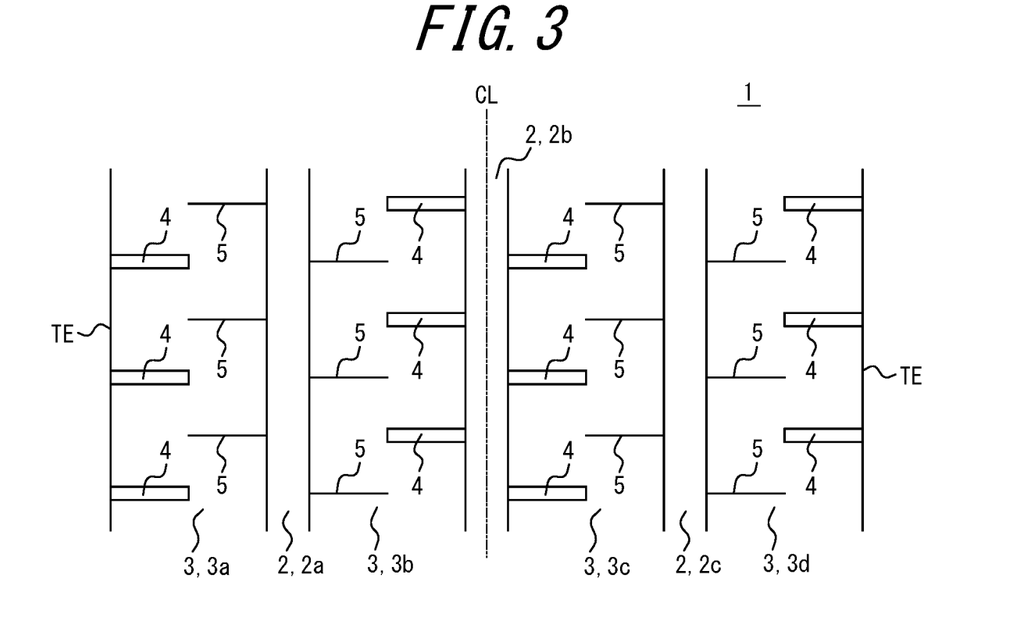
FIG. 3 is a developed view schematically illustrating a tread pattern of a pneumatic tire according to another embodiment of the present disclosure.

Next, another embodiment of the present disclosure will be described. FIG. 3 is a developed view schematically illustrating a tread pattern of a pneumatic tire according to another embodiment of the present disclosure.

The tread pattern illustrated in FIG. 3 differs from the tread pattern illustrated in FIG. 1 in that each land portion 3 further includes a plurality of widthwise sipes 5 extending in the tread width direction. Since the circumferential main grooves 2, the land portions 3, and the widthwise grooves 4 in the other embodiment illustrated in FIG. 3 are similar to those in the embodiment illustrated in FIG. 1, including the illustrated configurations and variations thereof, a detailed description is omitted, and examples of the widthwise sipes 5 are mainly described below.

In the illustrated example, each land portion 3 includes a plurality of widthwise sipes 5 extending in the tread width direction. Specifically, in the present example, the land portions 3a, 3d adjacent to a tread edge TE include widthwise sipes 5, three each in the illustrated range, that extend outward in the tread width direction from the circumferential main grooves 2a, 2c, respectively, and terminate in the land portions 3a, 3d. The land portions 3b, 3c by the center in the tread width direction also include widthwise sipes 5, three each in the illustrated range, that extend inward in the tread width direction from the circumferential main grooves 2a, 2c, respectively, and terminate in the land portions 3b, 3c. The number of the widthwise sipes 5 can be appropriately set. In the illustrated example, all of the land portions 3 include the widthwise sipes 5. When the widthwise sipes 5 are included on the tread surface 1, however, it suffices for any land portion 3 to include the widthwise sipes 5, and the land portions 3 defined by the tread edges TE (land portions 3*a*, 3*d* in the illustrated example) preferably include the widthwise sipes 5.

Here, the sipe width (opening width (opening width measured perpendicular to the extending direction of the sipe)) of the widthwise sipe 5 is not particularly limited, since the sipe width depends on the number of widthwise sipes 5, but can, for example, be between 0.2 mm and 1.0 mm. Similarly, the sipe depth (maximum depth) of the widthwise sipe 5 is not particularly limited, but can, for example, be between 4.0 mm and 18.0 mm.

In the illustrated example, all of the widthwise sipes 5 extend along the tread width direction (without inclination), but at least one of the widthwise sipes 5 may extend at an inclination relative to the tread width direction. In this case, the widthwise sipes 5 are preferably inclined relative to the tread width direction at an inclination angle of 45° or less, and are preferably inclined at an inclination angle of 30° or less. In the illustrated example, all of the widthwise sipes 5 extend straight in the tread width direction, but at least one of the widthwise sipes 5 may have a bent portion.

Here, to improve the drainage performance, the widthwise sipes 5 preferably open at the tread edge TE, or as in the illustrated example, a circumferential main groove 2. On the other hand, to increase the rigidity of the land portion 3, the widthwise sipes 5 can be configured not to open to either the tread edge TE or the circumferential main groove 2, so that both ends terminate in the land portion 3. Also, in the land portion 3 defined between two circumferential main grooves 2 adjacent in the tread width direction, the widthwise sipe 5 may open to either of the two circumferential main grooves 2.

Here, in the illustrated example, the widthwise grooves 4 and the widthwise sipes 5 are arranged alternately when viewed in the tread circumferential direction. This configuration can optimize the balance of rigidity of the land portion 3. On the other hand, as viewed in the tread circumferential direction, there may be a point at which two or more widthwise grooves 4 are arranged continuously between two adjacent widthwise sipes 5 in the tread circumferential direction, and there may be a point at which two or more widthwise sipes 5 are arranged continuously between two adjacent widthwise grooves 4 in the tread circumferential direction.

In the illustrated example, both the widthwise grooves 4 and the widthwise sipes 5 terminate in the center of the land portion 3 in the tread width direction. The widthwise grooves 4 and the widthwise sipes 5 may, however, have overlapping portions when projected in the tread circumferential direction, or may be arranged so as not to overlap.

Figure 4:
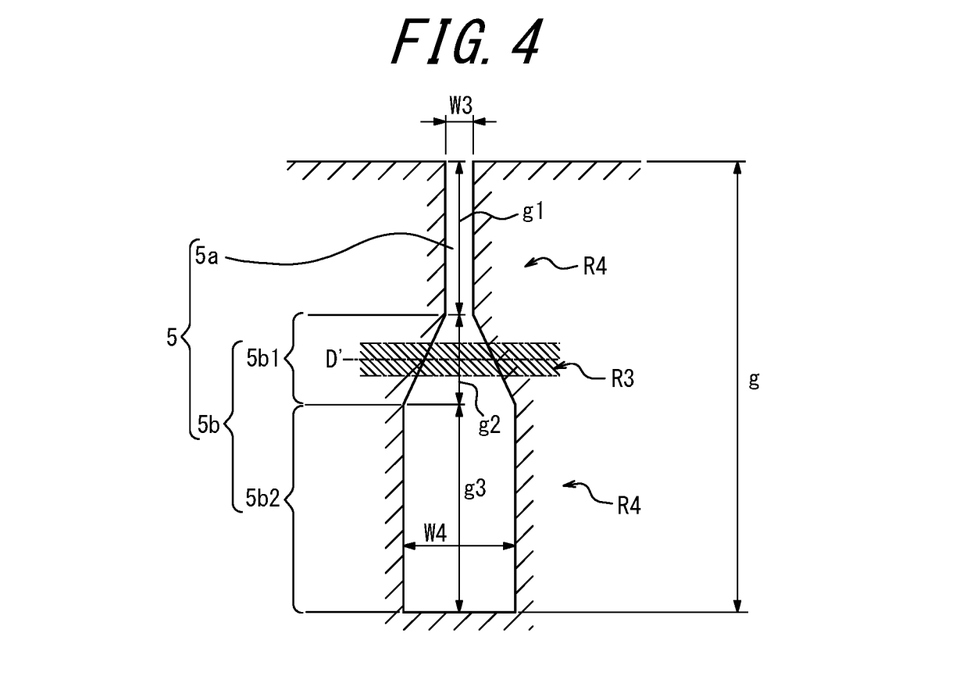
FIG. 4 is a cross-sectional view schematically illustrating an example of a widthwise sipe.

FIG. 4 is a cross-sectional view schematically illustrating an example of a widthwise sipe. FIG. 4 is a tread circumferential cross-sectional view of a widthwise sipe extending along the tread width direction. FIG. 4 illustrates a state in which the tire is mounted on an applicable rim, filled to a prescribed internal pressure, and under no load. As illustrated in FIG. 4, the widthwise sipe 5 includes a constant sipe width portion 5*a* on the tread surface 1 side, in which the sipe width (width measured parallel to the tread surface 1 in a cross-sectional view) is constant (equivalent to the opening width at the tread surface 1), and a widened portion 5*b* on the sipe bottom side, in which the sipe width is larger than on the tread surface 1 side. In the illustrated example, the widened portion 5*b* is formed by a first widened portion 5*b*1 in which the sipe width gradually increases towards the sipe bottom and a second widened portion 5*b*2 in which the sipe width is constant (and larger than the opening width at the tread surface 1).

In the illustrated example, the widened portion 5*b* is formed by the first widened portion 5*b*1 and the second widened portion 5*b*2, but the widened portion 5*b* can be configured to include only a portion (for example, the first widened portion 5*b*1) in which the sipe width changes in the sipe depth direction, or configured to include only a portion (the second widened portion 5*b*2) in which the sipe width is constant (and larger than the opening width at the tread surface 1). Alternatively, a portion (for example, the first widened portion 5*b*1) in which the sipe width changes and/or a portion (the second widened portion 5*b*2) in which the sipe width is constant (and larger than the opening width at the tread surface 1) may be provided at a plurality of locations in the sipe depth direction.

In the present example, the portion farther outward in the tire radial direction than the widened portion 5*b* is the constant sipe width portion 5*a* that has a constant sipe width, but this portion can also be a portion with a variable sipe width.

In the present example, the sipe width of the first widened portion 5*b*1 gradually increases linearly from the outside towards the inside in the tire radial direction (the rate of increase in groove width is constant), but the rate of increase in sipe width may be variable.

The sipe width W3 of the constant sipe width portion 5*a* is not particularly limited but can, for example, be between 0.2 mm and 1.0 mm. The maximum width W4 of the widened portion 5*b* is not particularly limited but can, for example, be between 1.2 mm and 6.0 mm. The sipe depth g of the widthwise sipe 5 is not particularly limited but can, for example, be between 4.0 mm and 18.0 mm. The sipe width at the bottom of the widthwise sipe 5 is preferably larger than 2.5 W3.

The extension length g1 in the depth direction of the constant sipe width portion 5*a* is not particularly limited but can, for example, be between 2.0 mm and 12 mm. The extension length g2+g3 in the depth direction of the widened portion 5*b* is not particularly limited but can, for example, be between 2.5 mm and 11.0 mm. In the example illustrated in FIG. 4, the extension length g2 of the first widened portion 5*b*1 in the depth direction is not particularly limited but can, for example, be between 1.0 mm and 3.0 mm, and the extension length g3 of the second widened portion 5*b*2 in the depth direction is not particularly limited but can, for example, be between 1.5 mm and 8.0 mm.

As illustrated in FIG. 4, when the tire is mounted on an applicable rim, filled to a prescribed internal pressure, and under no load, and the opening width of the widthwise sipe 5 at the tread surface 1 (i.e., the width of the constant sipe width portion 5*a* in the present example) is W3, the groove depth position, farthest outward in the tire radial direction, at which the sipe width of the widened portion 5*b* is at least 2.5 W3 is designated as a reference depth position D'. In the case in which the first widened portion 5*b*1 and the second widened portion 5*b*2 are included, as in the illustrated example, then the reference depth position D' is included in the first widened portion 5*b*1 in the present example, but the reference depth position D' may be included in the second widened portion 5*b*2.

At the aforementioned reference depth position D', the rigidity usually starts to decrease when wear progresses.

From the perspective of manufacturability, the reference depth position D and the reference depth position D' are preferably at the same depth but may differ, and the reference depth position D can be larger or smaller than the reference depth position D'.

In the tire of the present embodiment, the storage modulus of the tread rubber located in a tire radial direction region R3 including at least the reference depth position D is larger than the storage modulus of the tread rubber located in regions R4 inward and outward in the tire radial direction from the tire radial direction region (specifically, in the present embodiment, the storage modulus of the tread rubber in the tire radial direction region R3 is 1.5 or more times the storage modulus of the tread rubber in the regions R4 inward and outward in the tire radial direction from the tire radial direction region).

In the present embodiment, the tire radial direction region R3 includes a region extending 0.5 mm inward and 0.5 mm outward in the tire radial direction from the reference depth position D' (in particular, a region extending 1.0 mm inward and 1.0 mm outward in the tire radial direction from the reference depth position D' in the present example).

From the perspective of manufacturability, the ratio of the storage modulus of the tread rubber in the tire radial direction region R3 to the storage modulus of the tread rubber in the tire radial direction region R4 is preferably the same as the ratio of the storage modulus of the tread rubber in the tire radial direction region R1 to the storage modulus of the tread rubber in the tire radial direction region R2, but these ratios may differ, and either may be larger or smaller.

The extension form of the tread rubber with the above-described relatively high storage modulus can be as follows in a land portion to which the tread rubber with the above-described relatively high storage modulus is applied.

In the present example, the tread rubber in the tire radial direction region R3 with the above-described relatively high storage modulus extends continuously in the tread circumferential direction. The tread rubber in the tire radial direction region R3 with the above-described relatively high storage modulus can, however, be configured to extend in the tread width direction, or to exist only in a region surrounding the maximum width of the widened portion 5b, in the tire radial direction region R3 with the above-described relatively high storage modulus, in a transparent plan view from the tread surface 1 side (for example, a region surrounding 1 mm to 10 mm more than the maximum width).

In the present example, the thickness of the tread rubber with the above-described relatively high storage modulus is constant. However, the thickness of the tread rubber with the above-described relatively high storage modulus may change or include a discontinuous portion.

For example, in the case in which the tread rubber in the tire radial direction region R3, with the above-described relatively high storage modulus, extends continuously in the tread circumferential direction, and the thickness of the tread rubber in the tire radial direction region R3, with the above-described relatively high storage modulus, changes in the tread circumferential direction, then the thickness of the tread rubber at and near the widthwise sipe 5 is preferably larger than the thickness of the tread rubber at and near the center, in the tread circumferential direction, between two widthwise sipes 5 adjacent in the tread circumferential direction. In the case in which the tread rubber in the tire radial direction region R3, with the above-described relatively high storage modulus, extends in the tread circumferential direction and includes a discontinuous portion in the tread circumferential direction, for example, the discontinuous portion is preferably located at and near the center, in the tread circumferential direction, between two widthwise sipes 5 adjacent in the tread circumferential direction.

The effects of the pneumatic tire according to the other embodiment illustrated in FIGS. 3 and 4 are described below.

First, according to the pneumatic tire of the other embodiment illustrated in FIGS. 3 and 4, the same effects as in the embodiment illustrated in FIG. 1 can be obtained for the circumferential main groove 2, the land portions 3, and the widthwise grooves 4.

Additionally, the pneumatic tire of the present embodiment includes a plurality of widthwise sipes 5 extending in the tread width direction in the land portion 3, and the widthwise sipes 5 include the widened portion 5b, on the sipe bottom side, at which the sipe width is larger than on the tread surface 1 side. As a result, the widened portion 5b with a large sipe width is exposed to the tread surface when wear progresses, thereby improving the drainage performance when wear progresses.

In the pneumatic tire of the embodiment illustrated in FIGS. 3 and 4, the storage modulus of the tread rubber located in the tire radial direction region R3 including at least the reference depth position D' is larger than the storage modulus of the tread rubber located in the regions R4 inward and outward in the tire radial direction from the tire radial direction region. This can improve the rigidity at and near the reference depth position D' when wear progress, thereby suppressing local wear and uneven wear of the tire.

As described above, according to the pneumatic tire of the other embodiment illustrated in FIGS. 3 and 4, the drainage performance can be further improved while the occurrence of uneven wear is further suppressed when wear progresses.

Furthermore, in the present embodiment, the tire radial direction region R3 includes a region extending 0.5 mm inward and 0.5 mm outward in the tire radial direction from the reference depth position D'. The drainage performance can therefore be improved while the occurrence of uneven wear is further suppressed when wear progresses.

In the present embodiment, the storage modulus of the tread rubber located in the tire radial direction region R3 is 1.5 or more times the storage modulus of the tread rubber in the regions R4 inward and outward in the tire radial direction from the tire radial direction region. The drainage performance can therefore be improved while the occurrence of uneven wear is even further suppressed when wear progresses.

Figure 5:
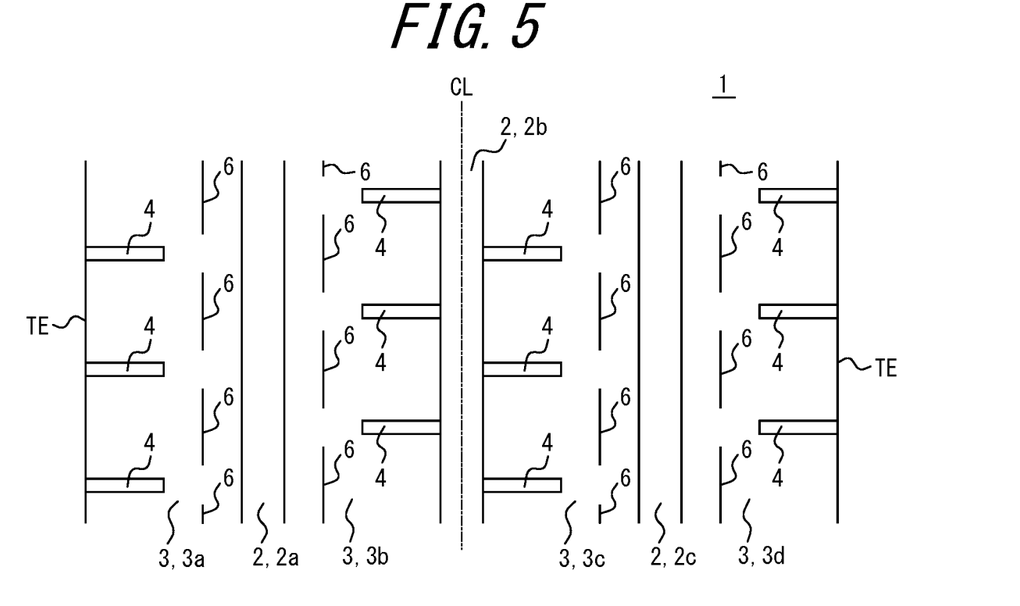
FIG. 5 is a developed view schematically illustrating a tread pattern of a pneumatic tire according to yet another embodiment of the present disclosure.

Next, yet another embodiment of the present disclosure will be described. FIG. 5 is a developed view schematically illustrating a tread pattern of a pneumatic tire according to yet another embodiment of the present disclosure.

The tread pattern illustrated in FIG. 5 differs from the tread pattern illustrated in FIG. 1 in that each land portion 3 further includes a plurality of circumferential sipes 6 extending in the tread circumferential direction. Since the circumferential main grooves 2, the rib-like land portions 3, and the widthwise grooves 4 in yet another embodiment illustrated in FIG. 5 are similar to those in the embodiment illustrated in FIG. 1, including the illustrated configurations and variations thereof, a detailed description is omitted, and examples of the circumferential sipes 6 are mainly described below.

In the illustrated example, each land portion 3 includes a plurality of circumferential sipes 6 extending in the tread circumferential direction. Specifically, in the present example, each land portion 3 adjacent to a tread edge TE includes circumferential sipes 6, four each in the illustrated range, that extend in the tread circumferential direction, with both ends terminating in the land portion 3. The number of the circumferential sipes 6 can be appropriately set. In the present example, both ends of the circumferential sipes 6 terminate within the land portion 3, but the circumferential sipes 6 may be configured as one circumferential sipe 6 that extends continuously in the tread circumferential direction. In the illustrated example, all of the land portions 3 include the circumferential sipes 6. When the circumferential sipes 6 are included on the tread surface 1, however, it suffices for any land portion 3 to include the circumferential sipes 6, and the land portions 3 defined by the tread edges TE (land portions 3*a*, 3*d* in the illustrated example) preferably include the circumferential sipes 6.

Here, the sipe width (opening width (opening width measured perpendicular to the extending direction of the circumferential sipe)) of the circumferential sipe 6 is not particularly limited, since the sipe width depends on the number of circumferential sipes 6, but can, for example, be between 0.2 mm and 1.5 mm. Similarly, the sipe depth (maximum depth) of the circumferential sipe 6 is not particularly limited, but can, for example, be between 4.0 mm and 18.0 mm.

In the illustrated example, all of the circumferential sipes 6 extend along the tread circumferential direction (without inclination), but at least one of the circumferential sipes 6 may extend at an inclination relative to the tread circumferential direction. In this case, the circumferential sipes 6 are preferably inclined relative to the tread circumferential direction at an inclination angle of 25° or less, and are preferably inclined at an inclination angle of 10° or less. In the illustrated example, all of the circumferential sipes 6 extend straight in the tread circumferential direction, but at least one of the circumferential sipes 6 may have a bent portion.

In the illustrated example, the widthwise grooves 4 and the circumferential sipes 6 are arranged in each land portion 3 so as not to overlap when projected in the tread width direction but may be arranged to partially overlap.

Figure 6:
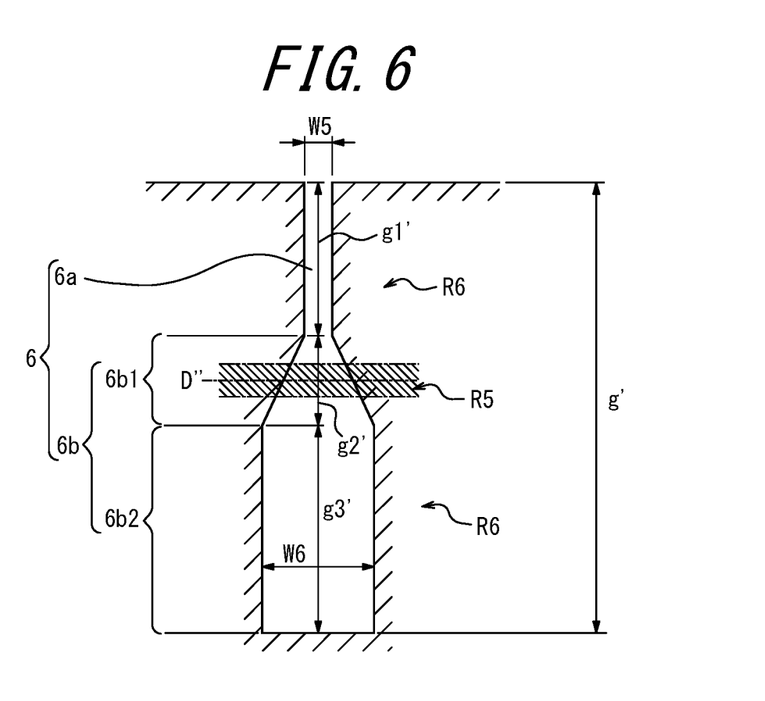
FIG. 6 is a cross-sectional view schematically illustrating an example of a circumferential sipe.

FIG. 6 is a cross-sectional view schematically illustrating an example of a circumferential sipe. FIG. 6 is a tread widthwise cross-sectional view of a circumferential sipe extending along the tread circumferential direction. FIG. 6 illustrates a state in which the tire is mounted on an applicable rim, filled to a prescribed internal pressure, and under no load. As illustrated in FIG. 6, the circumferential sipe 6 includes a constant sipe width portion 6*a* on the tread surface 1 side, in which the sipe width (width measured parallel to the tread surface 1 in a cross-sectional view) is constant (equivalent to the opening width at the tread surface 1), and a widened portion 6*b* on the sipe bottom side, in which the sipe width is larger than on the tread surface 1 side. In the illustrated example, the widened portion 6*b* is formed by a first widened portion 6*b*1 in which the sipe width gradually increases towards the sipe bottom and a second widened portion 6*b*2 in which the sipe width is constant (and larger than the opening width at the tread surface 1).

In the illustrated example, the widened portion 6*b* is formed by the first widened portion 6*b*1 and the second widened portion 6*b*2, but the widened portion 6*b* can be configured to include only a portion (for example, the first widened portion 6*b*1) in which the sipe width changes in the sipe depth direction, or configured to include only a portion (the second widened portion 6*b*2) in which the sipe width is constant (and larger than the opening width at the tread surface 1). Alternatively, a portion (for example, the first widened portion 6*b*1) in which the sipe width changes and/or a portion (the second widened portion 6*b*2) in which the sipe width is constant (and larger than the opening width at the tread surface 1) may be provided at a plurality of locations in the sipe depth direction.

In the present example, the portion farther outward in the tire radial direction than the widened portion 6*b* is the constant sipe width portion 6*a* that has a constant sipe width, but this portion can also be a portion with a variable sipe width.

In the present example, the sipe width of the first widened portion 6*b*1 gradually increases linearly from the outside towards the inside in the tire radial direction (the rate of increase in groove width is constant), but the rate of increase in sipe width may be variable.

The sipe width W5 of the constant sipe width portion 6*a* is not particularly limited but can, for example, be between 0.2 mm and 1.5 mm. The maximum width W6 of the widened portion 6*b* is not particularly limited but can, for example, be between 1.2 mm and 6.0 mm. The sipe depth g' of the circumferential sipe 6 is not particularly limited but can, for example, be between 4.0 mm and 18.0 mm. The sipe width at the bottom of the circumferential sipe 6 is preferably larger than 2.5 W5.

The extension length g1' in the depth direction of the constant sipe width portion 6*a* is not particularly limited but can, for example, be between 2.0 mm and 12 mm. The extension length g2'+g3' in the depth direction of the widened portion 6*b* is not particularly limited but can, for example, be between 2.5 mm and 11.0 mm. In the example illustrated in FIG. 6, the extension length g2' of the first widened portion 6*b*1 in the depth direction is not particularly limited but can, for example, be between 1.0 mm and 3.0 mm, and the extension length g3' of the second widened portion 6*b*2 in the depth direction is not particularly limited but can, for example, be between 1.5 mm and 8.0 mm.

As illustrated in FIG. 6, when the tire is mounted on an applicable rim, filled to a prescribed internal pressure, and under no load, and the opening width of the circumferential sipe 6 at the tread surface 1 (i.e., the width of the constant sipe width portion 6*a* in the present example) is W5, the groove depth position, farthest outward in the tire radial direction, at which the sipe width of the widened portion 6*b* is at least 2.5 W5 is designated as a reference depth position D". In the case in which the first widened portion 6*b*1 and the second widened portion 6*b*2 are included, as in the illustrated example, then the reference depth position D" is included in the first widened portion 6*b*1 in the present example, but the reference depth position D" may be included in the second widened portion 6*b*2.

At the aforementioned reference depth position D", the rigidity usually starts to decrease when wear progresses.

From the perspective of manufacturability, the reference depth position D and the reference depth position D" are preferably at the same depth but may differ, and the reference depth position D can be larger or smaller than the reference depth position D".

In the tire of the present embodiment, the storage modulus of the tread rubber located in a tire radial direction region R5 including at least the reference depth position D" is larger than the storage modulus of the tread rubber located in regions R6 inward and outward in the tire radial direction from the tire radial direction region (specifically, in the present embodiment, the storage modulus of the tread rubber in the tire radial direction region R5 is 1.5 or more times the storage modulus of the tread rubber in the regions R6 inward and outward in the tire radial direction from the tire radial direction region).

In the present embodiment, the tire radial direction region R5 includes a region extending 0.5 mm inward and 0.5 mm outward in the tire radial direction from the reference depth position D" (in particular, a region extending 1.0 mm inward and 1.0 mm outward in the tire radial direction from the reference depth position D" in the present example).

From the perspective of manufacturability, the ratio of the storage modulus of the tread rubber in the tire radial direction region R5 to the storage modulus of the tread rubber in the tire radial direction region R6 is preferably the same as the ratio of the storage modulus of the tread rubber in the tire radial direction region R1 to the storage modulus of the tread rubber in the tire radial direction region R2, but these ratios may differ, and either may be larger or smaller.

The extension form of the tread rubber with the above-described relatively high storage modulus can be as follows in a land portion to which the tread rubber with the above-described relatively high storage modulus is applied.

In the present example, the tread rubber with the above-described relatively high storage modulus extends continuously in the tread circumferential direction. The tread rubber with the above-described relatively high storage modulus can, however, be configured to extend in the tread width direction, or to exist only in a region surrounding the maximum width of the widened portion 6b, in the tire radial direction region R5 with the above-described relatively high storage modulus, in a transparent plan view from the tread surface 1 side (for example, a region surrounding 1 mm to 10 mm more than the maximum width).

In the present example, the thickness of the tread rubber in the tire radial direction region R5, with the above-described relatively high storage modulus, is constant. However, the thickness of the tread rubber in the tire radial direction region R5, with the above-described relatively high storage modulus, may change or include a discontinuous portion.

For example, in the case in which the tread rubber in the tire radial direction region R5, with the above-described relatively high storage modulus, extends continuously in the tread circumferential direction, and the thickness of the tread rubber in the tire radial direction region R5, with the above-described relatively high storage modulus, changes in the tread circumferential direction, then the thickness of the tread rubber at and near the circumferential sipe 6 is preferably larger than the thickness of the tread rubber at and near the center, in the tread circumferential direction, between two circumferential sipes 6 adjacent in the tread circumferential direction. In the case in which the tread rubber in the tire radial direction region R5, with the above-described relatively high storage modulus, extends in the tread circumferential direction and includes a discontinuous portion in the tread circumferential direction, for example, the discontinuous portion is preferably located at and near the center, in the tread circumferential direction, between two circumferential sipes 6 adjacent in the tread circumferential direction.

The effects of the pneumatic tire according to yet another embodiment illustrated in FIGS. 5 and 6 are described below.

First, according to the pneumatic tire of yet another embodiment illustrated in FIGS. 5 and 6, the same effects as in the embodiment illustrated in FIG. 1 can be obtained for the circumferential main groove 2, the rib-like land portions 3, and the widthwise grooves 4.

Additionally, the pneumatic tire of the present embodiment illustrated in FIGS. 5 and 6 includes a plurality of circumferential sipes 6 extending in the tread circumferential direction in the land portion 3, and each circumferential sipe 6 includes the widened portion 6b, on the sipe bottom side, at which the sipe width is larger than on the tread surface 1 side. As a result, the widened portion 6b with a larger sipe width is exposed to the tread surface when wear progresses, thereby improving the drainage performance when wear progresses.

In the pneumatic tire of the embodiment illustrated in FIGS. 5 and 6, the storage modulus of the tread rubber located in the tire radial direction region R5 including at least the reference depth position D" is larger than the storage modulus of the tread rubber located in the regions R6 inward and outward in the tire radial direction from the tire radial direction region. This can improve the rigidity at and near the reference depth position D" when wear progress, thereby suppressing local wear and uneven wear of the tire.

As described above, according to the pneumatic tire of yet another embodiment illustrated in FIGS. 5 and 6, the drainage performance can be further improved while the occurrence of uneven wear is further suppressed when wear progresses.

Furthermore, in the present embodiment, the tire radial direction region R5 includes a region extending 0.5 mm inward and 0.5 mm outward in the tire radial direction from the reference depth position D". The drainage performance can therefore be improved while the occurrence of uneven wear is further suppressed when wear progresses.

In the present embodiment, the storage modulus of the tread rubber located in the tire radial direction region R5 is 1.5 or more times the storage modulus of the tread rubber in the regions R6 inward and outward in the tire radial direction from the tire radial direction region. The drainage performance can therefore be improved while the occurrence of uneven wear is even further suppressed when wear progresses.

In each of the above examples, the tire radial direction region (in which the storage modulus of the tread rubber is relatively higher than other regions; for example, R1, R3, R5 in the above embodiments) preferably includes a region extending 0.5 mm inward and 0.5 mm outward in the tire radial direction from the reference depth position. This is because by adoption of the above range, the drainage performance can be improved while the occurrence of uneven wear is further suppressed when wear progresses. On the other hand, the tire radial direction region preferably includes a region extending 2.0 mm inward and 2.0 mm outward in the tire radial direction from the reference depth position, more preferably a region extending 1.0 mm inward and 1.0 mm outward, to prevent a decrease in ride comfort due to an excessively high rigidity of the land portion. The thickness of the tread rubber with a storage modulus relatively higher than other regions may be different inward and outward in the tire radial direction.

The storage modulus of the tread rubber located in the tire radial direction region is preferably 1.5 or more times the storage modulus of the tread rubber located in the regions inward and outward in the tire radial direction from the tire radial direction region. This is because by adoption of the above range, the drainage performance can be improved while the occurrence of uneven wear is further suppressed when wear progresses.

The storage modulus of the tread rubber located in the tire radial direction region is preferably 1.8 or more times the storage modulus of the tread rubber located in the regions inward and outward in the tire radial direction from the tire radial direction region. This is because by adoption of the above range, the drainage performance can be improved while the occurrence of uneven wear is particularly suppressed when wear progresses.

On the other hand, to prevent the step in rigidity in the tire radial direction from becoming too large, the storage modulus of the tread rubber located in the tire radial direction region is preferably at most 3.5 times the storage modulus of the tread rubber located in the regions inward and outward in the tire radial direction from the tire radial direction region.

At least the land portions defined by the tread edges preferably include the widthwise grooves having a widened portion (which uses the first tread rubber with the aforementioned relatively higher storage modulus than other regions). This is because, particularly at least in the land portions defined by the tread edges, the drainage performance can be improved while the occurrence of uneven wear is suppressed when wear progresses.

At least the land portions defined by the tread edges preferably include the widthwise sipes having the widened portion (which uses the first tread rubber with the aforementioned relatively higher storage modulus than other regions). This is because, particularly at least in the land portions defined by the tread edges, the drainage performance can be improved while the occurrence of uneven wear is suppressed when wear progresses.

At least the land portions defined by the tread edges preferably include the circumferential sipes having the widened portion (which uses the first tread rubber with the aforementioned relatively higher storage modulus than other regions). This is because, particularly at least in the land portions defined by the tread edges, the drainage performance can be improved while the occurrence of uneven wear is suppressed when wear progresses.

These configurations are particularly suitable for tires in which the amount of wear in the land portions defined by the tread edges is relatively high.

The aforementioned widthwise grooves can, for example, be manufactured using a mold having a corresponding shape. The aforementioned widthwise sipes and circumferential sipes can, for example, be manufactured using a blade having a corresponding shape. To use the tread rubber with a high storage modulus and the tread rubber with a low storage modulus together, a base cap (such as a split base cap), for example, in which the tread rubber with a high storage modulus can be disposed only in a range corresponding to the relevant groove position, and the tread rubber with a low storage modulus can be disposed in other ranges, can be used for manufacturing in a tread rubber extrusion apparatus.

While embodiments of the present disclosure have been described above, the present disclosure is in no way limited to the above embodiments. For example, in the other embodiment illustrated in FIGS. 3 and 4, the widthwise groove 4 has the shape illustrated in FIG. 2, and the widthwise sipe 5 has the shape illustrated in FIG. 4, but the widthwise groove 4 may be a groove with U-shaped cross-section or a V-shaped cross-section, for example, and the widthwise sipe 5 may have the shape illustrated in FIG. 4. Similarly, in yet another embodiment illustrated in FIGS. 5 and 6, the widthwise groove 4 has the shape illustrated in FIG. 2, and the circumferential sipe 6 has the shape illustrated in FIG. 6, but the widthwise groove 4 may be a groove with U-shaped cross-section or a V-shaped cross-section, for example, and the circumferential sipe 6 may have the shape illustrated in FIG. 6.

For example, although all of the land portions include the widthwise grooves in the embodiments illustrated in FIGS. 1 to 6, a configuration may be adopted in which the widthwise grooves are not included, and any of the land portions includes only the widthwise sipes and/or the circumferential sipes. In this case, the arrangement, sipe width, sipe depth, shape, and the like of the widthwise sipes and/or circumferential sipes can be similar to the configurations described in the embodiments illustrated in FIGS. 3 to 6. In other words, a configuration can be adopted in which the land portion includes a plurality of widthwise sipes extending in the tread width direction, the widthwise sipe includes a widened portion, on a sipe bottom side, at which a sipe width is larger than on the tread surface side, and the storage modulus of tread rubber located in a tire radial direction region including at least the reference depth position is larger than the storage modulus of tread rubber located in regions inward and outward in the tire radial direction from the tire radial direction region, and/or the land portion includes at least one circumferential sipe extending in the tread circumferential direction, the circumferential sipe includes a widened portion, on a sipe bottom side, at which a sipe width is larger than on the tread surface side, and the storage modulus of tread rubber located in a tire radial direction region including at least the reference depth position is larger than the storage modulus of tread rubber located in regions inward and outward in the tire radial direction from the tire radial direction region.

Furthermore, unlike the configuration illustrated in FIGS. 1 to 6, a configuration can be adopted in which widthwise grooves are included or omitted, and both the widthwise sipes and the circumferential sipes are included. In this case, the widthwise sipes and the circumferential sipes may or may not intersect each other. Furthermore, a configuration can be adopted in which the widthwise sipes and/or the circumferential sipes include a widened portion, on a sipe bottom side, at which a sipe width is larger than on the tread surface side, and the storage modulus of tread rubber located in a tire radial direction region including at least the reference depth position is larger than the storage modulus of tread rubber located in regions inward and outward in the tire radial direction from the tire radial direction region.

As described above, it suffices for the widthwise groove, the widthwise sipe, and/or the circumferential sipe to be included on the tread surface. Furthermore, it suffices to adopt a configuration in which the widthwise grooves, the widthwise sipes, and/or the circumferential sipes include a widened portion, on a groove bottom side (sipe bottom side), at which a groove width (sipe width) is larger than on the tread surface side, and the storage modulus of tread rubber located in a tire radial direction region including at least the reference depth position is larger than the storage modulus of tread rubber located in regions inward and outward in the tire radial direction from the tire radial direction region.

From the perspective of manufacturability, the reference depth position D, the reference depth position D', and the reference depth position D" preferably have the same depth. These depths may differ, however, in which case any of the reference depth position D, the reference depth position D', and the reference depth position D" may be deeper or shallower than any other.

From the perspective of manufacturability, the ratio of the aforementioned storage moduli is preferably the same with respect to the tread rubber that defines the widthwise grooves, the widthwise sipes, and the circumferential sipes, but the ratios may differ among these tread rubbers, and any ratio may be larger or smaller than any other ratio.

From a manufacturing perspective, the tire radial direction regions R1, R3, R5 that use the tread rubber with a relatively higher storage modulus than other regions all preferably extend continuously in the tread circumferential direction. However, in one or more of the tire radial direction regions R1, R3, R5 that use the tread rubber with a relatively higher storage modulus than other regions, the tread rubber may be configured to extend in the tread width direction, or to exist only in a region surrounding the maximum width of the widened portion, in the tire radial direction region, in a transparent plan view from the tread surface 1 side (for example, a region surrounding 1 mm to 10 mm more than the maximum width).

From a manufacturing perspective, the thickness of the tread rubber in the tire radial direction regions R1, R3, R5 that use the tread rubber with a relatively higher storage modulus than other regions is preferably constant. However, in one or more of the tire radial direction regions R1, R3, R5 that use the tread rubber with a relatively higher storage modulus than other regions, the thickness of the tread rubber may change or may include a discontinuous portion.

When the widthwise grooves, the widthwise sipes, and the circumferential sipes have corners, a rounded portion may be formed by chamfering or the like at any one or more of the corners.

The pneumatic tire of the present disclosure is particularly suitable for use as a passenger vehicle tire or a heavy-duty tire (especially a truck/bus tire).

REFERENCE SIGNS LIST

1 Tread surface
2 Circumferential main groove
3 Land portion
4 Widthwise groove
4a Constant groove width portion
4b Widened portion
4b1 First widened portion
4b2 Second widened portion
5 Widthwise sipe
5a Constant sipe width portion
5b Widened portion
5b1 First widened portion
5b2 Second widened portion
6 Circumferential sipe
6a Constant sipe width portion
6b Widened portion
6b1 First widened portion
6b2 Second widened portion
CL Tire equatorial plane
TE Tread edge

The invention claimed is:

1. A pneumatic tire comprising, on a tread surface, a plurality of circumferential main grooves extending in a tread circumferential direction, and a plurality of land portions, each land portion being between circumferential main grooves adjacent in a tread width direction among the plurality of circumferential main grooves, or between one of the circumferential main grooves and a tread edge, wherein
at least one of the land portions includes a plurality of widthwise grooves extending in the tread width direction,
the widthwise grooves include a widened portion, on a groove bottom side, at which a groove width is larger than on the tread surface side,
when the pneumatic tire is mounted on an applicable rim, filled to a prescribed internal pressure, and under no load, a groove depth position, farthest outward in a tire radial direction, at which the groove width of the widened portion of the widthwise groove is 2.5 or more times an opening width of the widthwise groove at the tread surface is a reference depth position,
a storage modulus of tread rubber only in a tire radial direction region including the reference depth position is larger than a storage modulus of tread rubber in regions inward and outward in the tire radial direction from the tire radial direction region,
the tire radial direction region includes a region extending 0.5 mm inward and 0.5 mm outward in the tire radial direction from the reference depth position, and
a thickness of the tread rubber in the tire radial direction region including the reference depth position is constant.

2. The pneumatic tire of claim 1, wherein the storage modulus of the tread rubber in the tire radial direction region is 1.5 or more times the storage modulus of the tread rubber in regions inward and outward in the tire radial direction from the tire radial direction region.

3. The pneumatic tire of claim 1, wherein the storage modulus of the tread rubber in the tire radial direction region is 1.8 or more times the storage modulus of the tread rubber in regions inward and outward in the tire radial direction from the tire radial direction region.

4. The pneumatic tire of claim 1, wherein the at least one of the land portions is the land portion between the one of the circumferential main grooves and the tread edge.

5. A pneumatic tire comprising, on a tread surface, a plurality of circumferential main grooves extending in a tread circumferential direction, and a plurality of land portions, each land portion being between circumferential main grooves adjacent in a tread width direction among the plurality of circumferential main grooves, or between one of the circumferential main grooves and a tread edge, wherein
at least one of the land portions includes a plurality of widthwise sipes extending in the tread width direction,
the widthwise sipes include a widened portion, on a sipe bottom side, at which a sipe width is larger than on the tread surface side,
when the pneumatic tire is mounted on an applicable rim, filled to a prescribed internal pressure, and under no load, a sipe depth position, farthest outward in a tire radial direction, at which the sipe width of the widened portion of the widthwise sipe is 2.5 or more times an opening width of the widthwise sipe at the tread surface is a reference depth position,
a storage modulus of tread rubber only in a tire radial direction region including the reference depth position is larger than a storage modulus of tread rubber located in regions inward and outward in the tire radial direction from the tire radial direction region,
the tire radial direction region includes a region extending 0.5 mm inward and 0.5 mm outward in the tire radial direction from the reference depth position, and
a thickness of the tread rubber in the tire radial direction region including the reference depth position is constant.

6. The pneumatic tire of claim 5, wherein the at least one of the land portions is the land portion between the one of the circumferential main grooves and the tread edge.

7. The pneumatic tire of claim 5, wherein the storage modulus of the tread rubber in the tire radial direction region is 1.5 or more times the storage modulus of the tread rubber in regions inward and outward in the tire radial direction from the tire radial direction region.

8. The pneumatic tire of claim 5, wherein the storage modulus of the tread rubber in the tire radial direction region is 1.8 or more times the storage modulus of the tread rubber in regions inward and outward in the tire radial direction from the tire radial direction region.

9. A pneumatic tire comprising, on a tread surface, a plurality of circumferential main grooves extending in a tread circumferential direction, and a plurality of land portions, each land portion being between circumferential main grooves adjacent in a tread width direction among the plurality of circumferential main grooves, or between one of the circumferential main grooves and a tread edge, wherein
   at least one of the land portions includes at least one circumferential sipe extending in the tread circumferential direction,
   the circumferential sipe includes a widened portion, on a sipe bottom side, at which a sipe width is larger than on the tread surface side,
   when the pneumatic tire is mounted on an applicable rim, filled to a prescribed internal pressure, and under no load, a sipe depth position, farthest outward in a tire radial direction, at which the sipe width of the widened portion of the circumferential sipe is 2.5 or more times an opening width of the circumferential sipe at the tread surface is a reference depth position,
   a storage modulus of tread rubber only in a tire radial direction region including at least the reference depth position is larger than a storage modulus of tread rubber in regions inward and outward in the tire radial direction from the tire radial direction region,
   the tire radial direction region includes a region extending 0.5 mm inward and 0.5 mm outward in the tire radial direction from the reference depth position, and
   a thickness of the tread rubber in the tire radial direction region including the reference depth position is constant.

10. The pneumatic tire of claim 9, wherein the at least one of the land portions is the land portion between the one of the circumferential main grooves and the tread edge.

11. The pneumatic tire of claim 9, wherein the storage modulus of the tread rubber in the tire radial direction region is 1.5 or more times the storage modulus of the tread rubber in regions inward and outward in the tire radial direction from the tire radial direction region.

12. The pneumatic tire of claim 9, wherein the storage modulus of the tread rubber in the tire radial direction region is 1.8 or more times the storage modulus of the tread rubber in regions inward and outward in the tire radial direction from the tire radial direction region.

* * * * *